United States Patent Office 2,879,277
Patented Mar. 24, 1959

2,879,277

15 KETOPROGESTERONES

Josef Fried, New Brunswick, Richard W. Thoma, Somerville, David Perlman, Princeton, and John R. Gerke, Franklin Township, N.J., assignors to Olin Mathieson Chemical Corporation, New York, N.Y., a corporation of Virginia No Drawing. Application May 27, 1955
Serial No. 511,782

2 Claims. (Cl. 260—397.3)

This application is a continuation-in-part of our copending application, Serial Number 372,798, filed August 6, 1953, now Patent No. 2,753,290, granted July 3, 1956.

This invention relates to the synthesis of valuable steroids.

One object of this invention is the provision of steroids of the pregnane (including the $\Delta^4$-pregnene and the $\Delta^4$-14-iso-17-isopregnene) series having a 15-keto group, which compounds are useful either for their own physiological action or as intermediates in the preparation of physiologically active derivatives.

The compounds of this invention comprise 15-ketoprogesterone and 15-keto-14-iso-17-isoprogesterone. The preparation of the 15-ketoprogesterone of this invention by the oxidation of 15-hydroxyprogesterone is disclosed in our copending application, Serial Number 372,798, filed August 6, 1953, now patent No. 2,753,290, granted July 3, 1956. The 15-keto-14-iso-17-isoprogesterone of this invention is prepared by isomerization of 15-ketoprogesterone.

To prepare the 15-ketoprogesterone of this invention, either 15α-hydroxyprogesterone or 15β-hydroxyprogesterone is oxidized. To effect this oxidation, the 15-hydroxy steroid is treated with an oxidizing agent such as a hexavalent chromium (chromic) ion, e.g. chromic oxide, preferably in an organic acid medium (e. g. glacial acetic acid). The 15-keto-14-iso-17-isoprogesterone of this invention is prepared by isomerizing 15-ketoprogesterone. This isomerization can be effected by treating the 15-ketoprogesterone with a base, such as an alkali (e.g. potassium hydroxide). The reaction can be conducted in either an aqueous or organic solution but is preferably carried out in an organic solvent wherein both the 15-ketoprogesterone and the base are soluble. Examples of such solvents are the lower alkanols (e.g., methanol and ethanol).

The 15-ketoprogesterone of this invention is an active material which possesses progestational activity, and thus can be administered instead of, and in the same manner as, progesterone in the treatment of functional uterine bleeding and amenorrhea. The 15-keto-14-iso-17-isoprogesterone of this invention is also an active material which possesses androgenic activity and thus can be administered instead of, and in the same manner as, testosterone propionate in the treatment of eunuchoidism or hypogonadism.

The following examples are illustrative of the invention (all temperatures being in centigrade):

EXAMPLE 1

Oxidation of the 15α-hydroxyprogesterone to 15-ketoprogesterone

To a solution of 20 mg. of 15α-hydroxyprogesterone in 2 ml. of glacial acetic acid is added a solution of 10 mg. of chromic acid in 2 ml. acetic acid. One hour later, 0.2 ml. of alcohol is added; and after an additional 10 minutes the solution is evaporated to small volume in vacuo. The residue is taken up in little water, and extracted 3 times with 5 ml. of chloroform. The chloroform solution is extracted with water, dilute sodium bicarbonate solution, and again with water, and after drying over sodium sulfate is evaporated to dryness in vacuo. The residue, weighing about 20 mg., is crystallized from acetone-hexane, and yields 15-ketoprogesterone having the following properties: M.P. about 157–160°, $[\alpha]_D^{24}$ +195° (c., 0.50 in CHCl$_3$);

$\lambda_{max.}^{alc.}$ 239 m$\mu$($\epsilon$=16,400); $\lambda_{max.}^{Nujol}$ 5.77$\mu$ (15-keto); 5.89$\mu$ (20-keto), 6.06$\mu$($\Delta^4$-3-keto).

Analysis.—Calcd. for C$_{21}$H$_{28}$O$_3$: C, 76.79; H, 8.59. Found: C, 76.90; H, 8.57.

EXAMPLE 2

Oxidation of 15β-hydroxyprogesterone to 15-ketoprogesterone

The oxidation of 22 mg. of 15β-hydroxyprogesterone is conducted as described for the 15α-hydroxyprogesterone in Example 1. The recrystallized product has the following properties: M.P. about 159–160°, $[\alpha]_D^{23}$ +200° (c., 0.49 in CHCl$_3$);

$\lambda_{max.}^{alc.}$ 238 m$\mu$($\epsilon$=16,000)

The infrared spectrum is identical with that of the product obtained in Example 1, and the melting point of a mixture of the two products shows no depression.

EXAMPLE 3

Isomerization of 15-ketoprogesterone to 15-keto-14-iso-17-isoprogesterone

To a solution of 51 mg. of 15-ketoprogesterone in 5 ml. of methyl alcohol is added 0.2 ml. of 1.35 N methanolic potassium hydroxide. Isomerization occurs rapidly as evidenced by the rapid drop in specific rotation from an initial value of 190° to an equilibrium value of 126° after 2 hours. The solution is diluted with water and the methanol taken off in vacuo. Chloroform is added and the chloroform extract washed with dilute sodium bicarbonate solution, and with water. After drying over sodium sulfate and evaporation of the solvent in vacuo, a crystalline residue results which is purified by chromatography on silica gel. Elution of the column with 10% chloroform-benzene (600 ml.), 25% chloroform-benzene (500 ml.) and 50% chloroform-benzene (700 ml.) affords crystalline material representing 15-keto-14-iso-17-isoprogesterone which after recrystallization from acetone-hexane has the following properties: M.P. about 211–213°; $[\alpha]_D^{23}$ +113° (c., 0.65 in chloroform);

$\lambda_{max.}^{alc.}$ 239 m$\mu$($\epsilon$=17,900); $\lambda_{max.}^{Nujol}$ 5.77$\mu$(15-keto); 5.86 (20-keto), 6.00, 6.19$\mu$($\Delta^4$-3-keto).

Analysis.—Calcd. for C$_{21}$H$_{28}$O$_3$ (328.43): C, 76.79; H, 8.59. C, 76.53; H, 8.72.

15-keto-14-iso-17-isoprogesterone can also be termed 15-keto-14β,17α-progesterone and can be represented by the formula

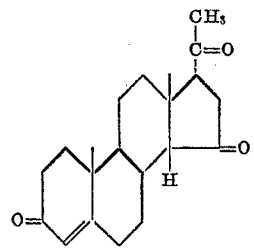

The invention may be otherwise variously embodied within the scope of the appended claims.

We claim:
1. 15-ketoprogesterone.
2. 15-keto-14-iso-17-isoprogesterone.

No references cited.